(12) United States Patent
Rong

(10) Patent No.: US 10,739,597 B2
(45) Date of Patent: Aug. 11, 2020

(54) DISPLAY HAVING EXPANDED FIELD OF VIEW WITH SELECTABLE OPTICAL ELEMENT

(71) Applicant: Facebook Technologies, LLC, Menlo Park, CA (US)

(72) Inventor: Wei Rong, San Jose, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/224,024

(22) Filed: Dec. 18, 2018

(65) Prior Publication Data
US 2020/0192098 A1   Jun. 18, 2020

(51) Int. Cl.
*G02B 27/01* (2006.01)
*G02B 5/30* (2006.01)

(52) U.S. Cl.
CPC ....... *G02B 27/0172* (2013.01); *G02B 5/3025* (2013.01); *G02B 2027/0123* (2013.01)

(58) Field of Classification Search
CPC .................................. G02B 27/0172
USPC ............................................................ 345/8
See application file for complete search history.

(56) References Cited

U.S. PATENT DOCUMENTS

| 2017/0061578 A1* | 3/2017 | Nakamura | ............ H01L 27/322 |
| 2017/0108702 A1* | 4/2017 | Rabner | ............... G02B 27/0101 |
| 2017/0371162 A1* | 12/2017 | Makino | ............... G02B 27/0172 |

* cited by examiner

*Primary Examiner* — Long D Pham
(74) *Attorney, Agent, or Firm* — Freestone Intellectual Property Law PLLC; Aaron J. Visbeek

(57) ABSTRACT

A head mounted display (HMD) includes first display pixels, second display pixels, and third display pixels. The second display pixels are disposed between the first display pixels and the third display pixels. The first display pixels and the second display pixels are within a first field of view (FOV) of a first eye of a user of the HMD and the second display pixels and the third display pixels are within a second FOV of a second eye of the user. A selectable optical element is driven to a first state and a second state to make the second display light from the second display pixels visible to the first eye during a first time period and visible to the second eye during a second time period to expand the FOV for the user.

20 Claims, 8 Drawing Sheets

DISPLAY HAVING EXPANDED FIELD OF VIEW WITH SELECTABLE OPTICAL ELEMENT

TECHNICAL FIELD

This disclosure relates generally to optics and in particular to display systems.

BACKGROUND INFORMATION

In certain contexts, it is advantageous for a display system to have a wide field of view (FOV). As a display system gets more compact, it may become more difficult to provide a wide FOV. In the particular context of a head mounted display (HMD), one or more displays is typically included in the HMD and optics assist in presenting virtual images to the eye of a user. However, given the space constraints for the display and optics, the FOV provided to a user of the HMD may be relatively narrow.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
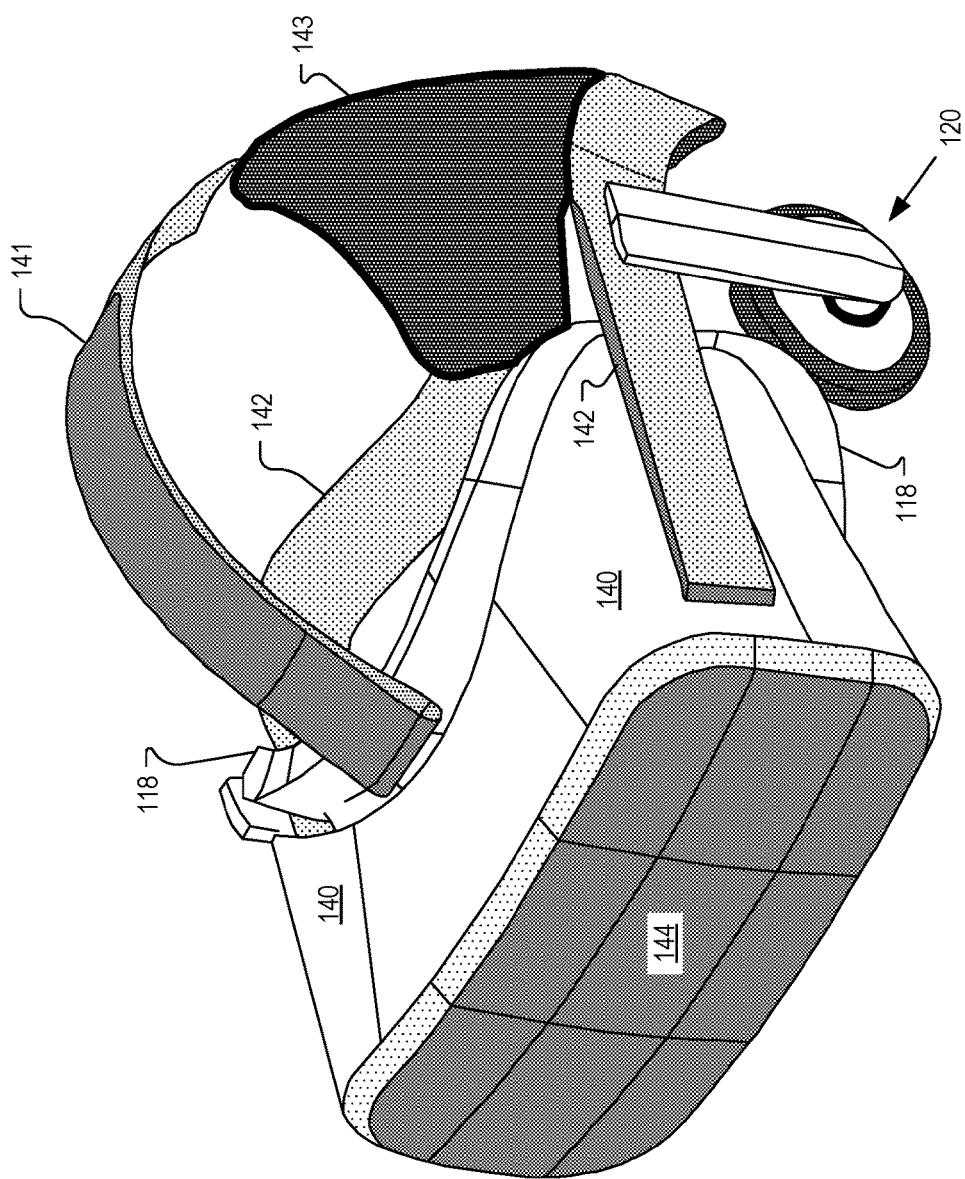
FIG. 1 illustrates an example head mounted display (HMD) that may include one or more displays that presents images to a user of the HMD, in accordance with an embodiment of the disclosure.

Embodiments of a system, device, and method for expanding a field of view (FOV) with a selectable optical element are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of this disclosure include a system, device, and method for expanding a field of view (FOV) with a selectable optical element. A display system may have first display pixels, second display pixels, and third display pixels, which may be included in a contiguous display pixel array where second display pixels are between the first display pixels and the third display pixels. In a head mounted display (HMD), a first lens may provide a first eye with a view of the first and second display pixels and a second lens may provide a second eye with a view of the second display pixels and the third display pixels. The selectable optical element is driven between a first state and a second state. Second display light from the second display pixels is visible to the first eye when the selectable optical element is driven to the first state and the second display light is visible to the second eye when the selectable optical element is driven to the first state. Since each eye is able to receive the second display light from the second display pixels, the FOV for each eye is expanded.

In one embodiment, the selectable optical element includes a switchable waveplate having a first retardance value (e.g. $0\lambda$) in the first state and a second retardance value (e.g. $\lambda/2$) in the second state. Switching the retardance value may switch the polarization orientation of the second display light when the switchable waveplate is disposed over the second display pixels. A first polarization layer may be placed in front of the first eye to block the second polarization orientation and a second polarization layer may be placed in front of the first eye to block the first polarization orientation so the second display light is only visible to the intended eye. By providing the second display light from the second display pixels to both eye in a time-sequential manner, the FOV for both eyes can be expanded. These and other embodiments are described below with respect to FIGS. 1-7.

FIG. 1 illustrates an example head mounted display (HMD) 100 that may include one or more displays that presents images to a user of the HMD, in accordance with an embodiment of the disclosure. Example head mounted display (HMD) 100 includes a top structure 141, a rear securing structure 143, and a side structure 142 attached with a viewing structure 140 having a front rigid body 144. The illustrated HMD 100 is configured to be worn on a head of a user of the HMD. In one embodiment, top structure 141 includes a fabric strap that may include elastic. Side structure 142 and rear securing structure 143 may include a fabric as well as rigid structures (e.g. plastics) for securing the HMD to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include a display system having one or more displays for directing image light to a wearer of HMD 100. The display system may include one or more of an LCD, an organic light emitting diode (OLED) display, or micro-LED display for directing image light to a wearer of HMD 100. In some embodiments, an eye-tracking camera may be included in viewing structure 140 and positioned to capture image(s) of an eye of a user of HMD 100.

Figure 2:
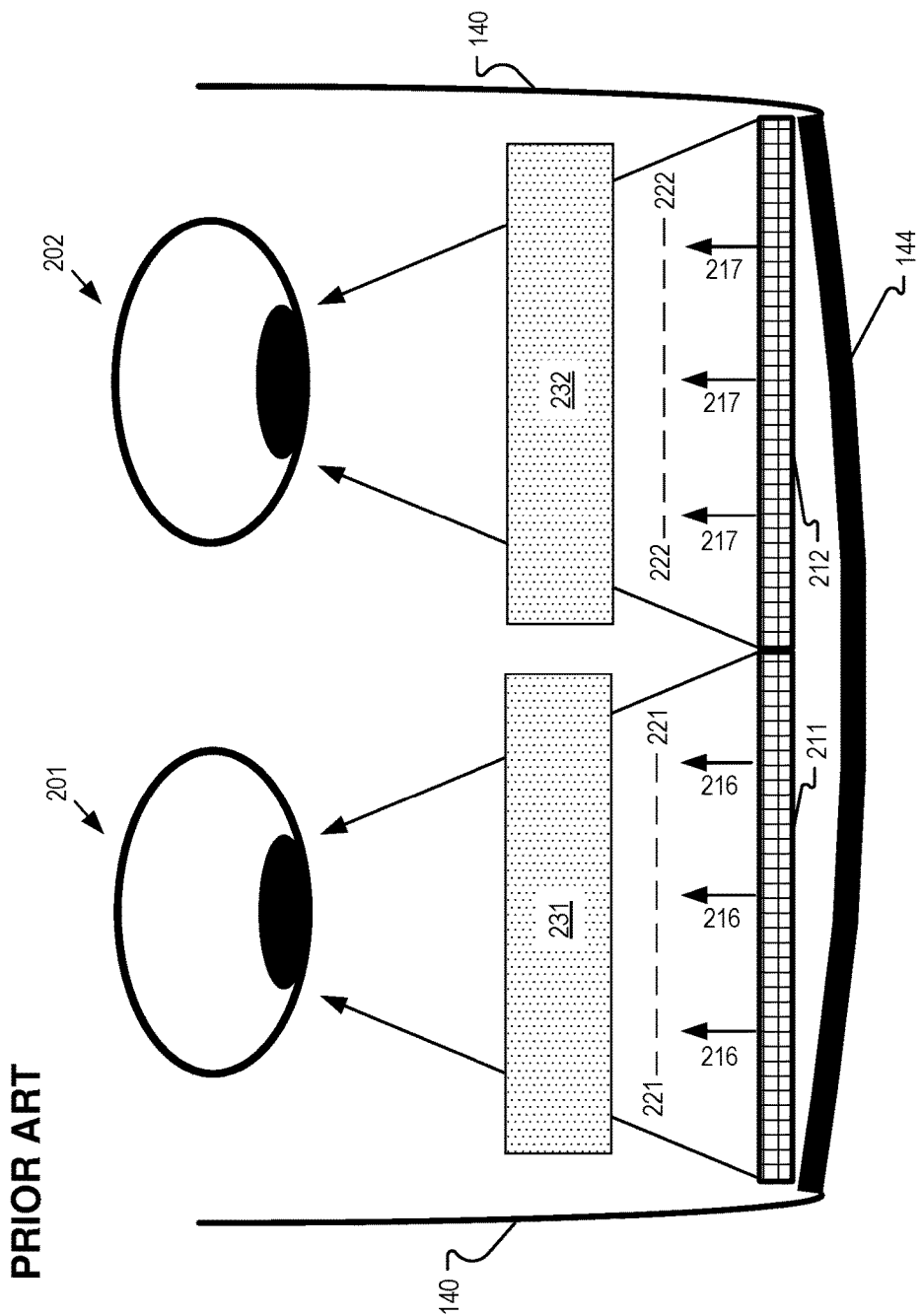
FIG. 2 illustrates a cut away view of a conventional HMD.

FIG. 2 illustrates a cut away view of an HMD 200 that includes display pixels 211 and display pixels 212. Display pixels 211 and display pixels 212 may be in separate displays or be included in a same display. Optical assembly 231 focuses display light 216 emitted from the display pixels 211 for eye 201 and optical assembly 232 focuses display light 217 emitted from the display pixels 212 for eye 202. Optical assembly 231 and 232 may be a double meniscus lens, for example. Eye 201 has a FOV 221 (provided by optical assembly 231) that includes display pixels 211 but not display pixels 212 and eye 202 has a FOV 222 (provided by optical assembly 232) that includes display pixels 212 but display pixels 211.

Figure 3:
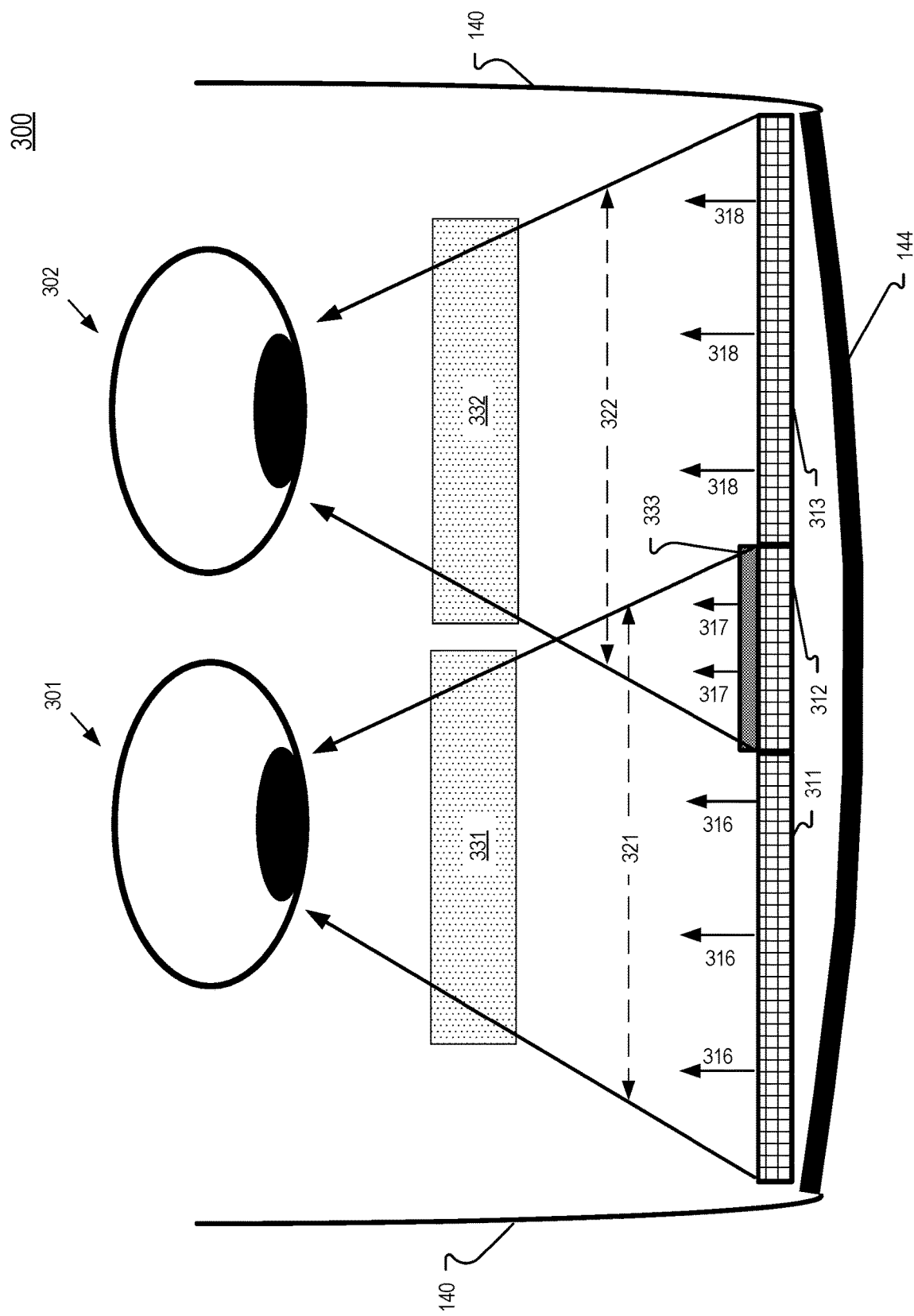
FIG. 3 illustrates a cut away view of an HMD that includes first display pixels, second display pixels, third display pixels, and a selectable optical element, in accordance with an embodiment of the disclosure.

FIG. 3 illustrates a cut away view of an HMD 300 that includes first display pixels 311, second display pixels 312, third display pixels 313, and a selectable optical element 333, in accordance with an embodiment of the disclosure. The second display pixels 312 are disposed between the first display pixels 311 and the third display pixels 313. In FIG. 3, selectable optical element 333 is illustrated as disposed over second display pixels 312. The first display pixels 311 and the second display pixels 312 are within a first FOV 321 of a first eye 301 of a user of the HMD 300. The second display pixels 312 and the third display pixels 313 are within a second FOV 322 of a second eye 302 of the user. First optical assembly 331 is configured to focus first display light 316 (emitted by first display pixels 311) and second display light 317 (emitted by second display pixels 312) for first eye 301. Second optical assembly 332 is configured to focus second display light 317 (emitted by second display pixels 312) and third display light 318 (emitted by third display pixels 313) for second eye 302. First and second optical assembly 331 and 332 may be double meniscus lenses utilizing only refractive optical power or may be sophisticated multilayer optical assemblies that may utilizes refractive and/or diffractive optical power.

First eye 301 and second eye 302 may each receive second display light 317 in their overlapping FOVs 321 and 322, which expands the FOV for each eye. However, second display light 317 may only be viewable to each eye in select time periods corresponding to a state of selectable optical element 333. Second display light 317 may be viewable by eye 301 through the first optical assembly 331 and not by eye 302 through the second optical assembly 332 when the selectable optical element 333 is driven to a first state. And, second display light 317 may be viewable by eye 302 through the second optical assembly 332 and not by eye 301 through the first optical assembly 331 when the selectable optical element 333 is driven to a second state. Selectable optical element 333 may provide the second display light 317 to eyes 301 and 302 in a time sequential manner by providing the second display light 317 to the first eye 301 in a first time period and providing the second display light 317 to the second eye 302 in a second time period. The second time period may be immediately subsequent to the first time period and the first and second time period may be on the order of milliseconds corresponding to a frame rate where each eye 301 and 302 does not perceive when the second display light 317 is (or is not) being provided to the eye.

Since each eye 301/302 may only receive second display light 317 for half the time period that the eye receives first display light 316 or third display light 318, the brightness of second display pixels 312 may be increased, in some embodiments. First display pixels 311, second display pixels 312, and third display pixels 313 are included in a single display having a contiguous display pixel array, in some embodiments. In this embodiment, the first display pixels 311, second display pixels 312, and third display pixels 313 are pixel groups within the same display pixel array that may be arranged in pixel rows and pixel columns. If the contiguous display pixel array is an OLED or micro-LED display, the second display pixels 312 may simply be driven harder (e.g. more current to the pixels or double the frame rate) to achieve a higher brightness value for second display light 317.

In one embodiment, first display pixels 311, second display pixels 312, and third display pixels 313 are included in their own individual and separate display or display pixel array. In this embodiment, the second display that includes the second display pixels 312 may be configured to be brighter to achieve a higher brightness value for second display light 317. If the second display utilizes an LCD architecture, the backlight of the LCD may be driven to a higher brightness to increase the brightness of second display light 317. In one embodiment, first display pixels 311 and approximately half of second display pixels 312 are included in a first display while third display pixels 313 and the remaining half of second display pixels 312 are included in a second display that are immediately adjacent to each other.

Figure 4A:
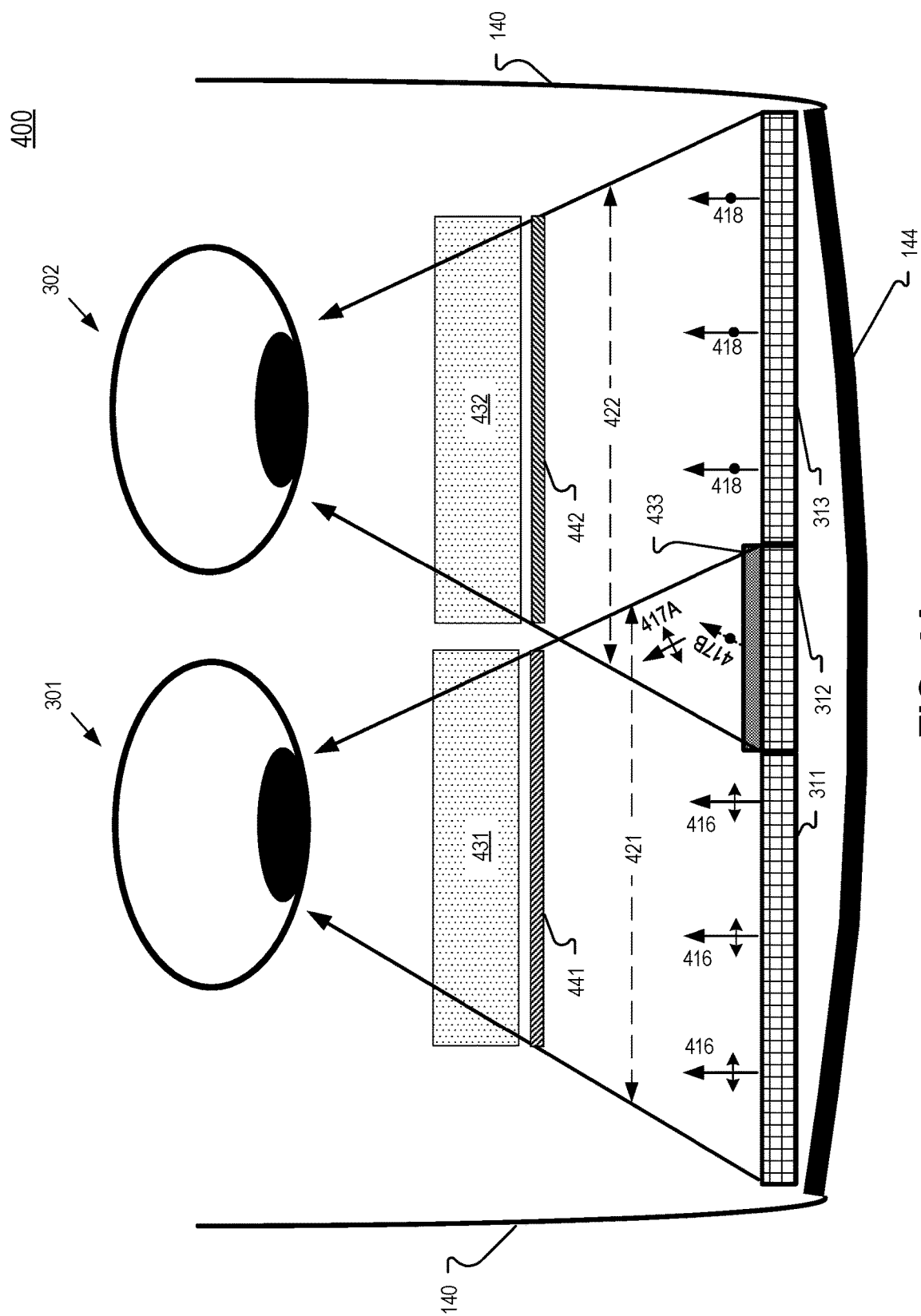
FIGS. 4A-4B an HMD having a switchable half-waveplate as a selectable optical element, in accordance with an embodiment of the disclosure.

FIG. 4A illustrates a cut away view of an HMD 400 having a switchable waveplate 433 as the selectable optical element, in accordance with an embodiment of the disclosure. In FIG. 4A, a switchable half-waveplate 433 is illustrated as disposed over second display pixels 312. The first display pixels 311 and the second display pixels 312 are within a first FOV 421 of first eye 301 of the HMD 400. The second display pixels 312 and the third display pixels 313 are within a second FOV 422 of second eye 302. Optical assembly 431 is configured to focus first display light 416 (emitted by first display pixels 311) and second display light 417A (emitted by second display pixels 312 during a first time period) for first eye 301. Optical assembly 432 is configured to focus second display light 417B (emitted by second display pixels 312 during a second time period) and third display light 418 (emitted by third display pixels 313) for second eye 302.

Switchable half-waveplate (SHW) 433 may be selectively driven to a first state corresponding to a first retardance value (e.g. $0\lambda$) and a second state corresponding to a second retardance value (e.g. $\lambda/2$). A processing logic (not illustrated) may send a digital or analog electronic signal to SHW 433 to select between the first and second state, for example. When SHW 433 is in the first state corresponding to the first retardance value, the polarization orientation of second display light emitted by second display pixels 312 may be unchanged as it propagates through SHW 433. When SHW 433 is in the second state corresponding to the second retardance value, the polarization orientation of second display light emitted by second display pixels 312 may be changed to a second polarization orientation that is different from the first polarization orientation.

In FIG. 4A, the polarization orientation of the second display light emitted by second display pixels 312 may be p-polarized light and when SHW 433 is in the first state corresponding to a retardance value of 0λ, the second display light emitted from SHW 433 retains its p-polarization, as illustrated by second display light 417A. However, when SHW 433 is driven to the second state corresponding to a retardance value of λ/2, second display light having the p-polarization is converted to s-polarized light, as illustrated by second display light 417B. In other words, SHW 433 imparts the first polarization orientation to the second display light while SHW 433 is driven to the first state and imparts the second polarization orientation to the second display light while SHW 433 is driven to the second state. Notably, first display light 416 and second display light 417A are the first polarization orientation (p-polarization in the illustrated embodiment of FIG. 4A) and third display light 418 and second display light 417B are the second polarization orientation (s-polarization).

Figure 4B:
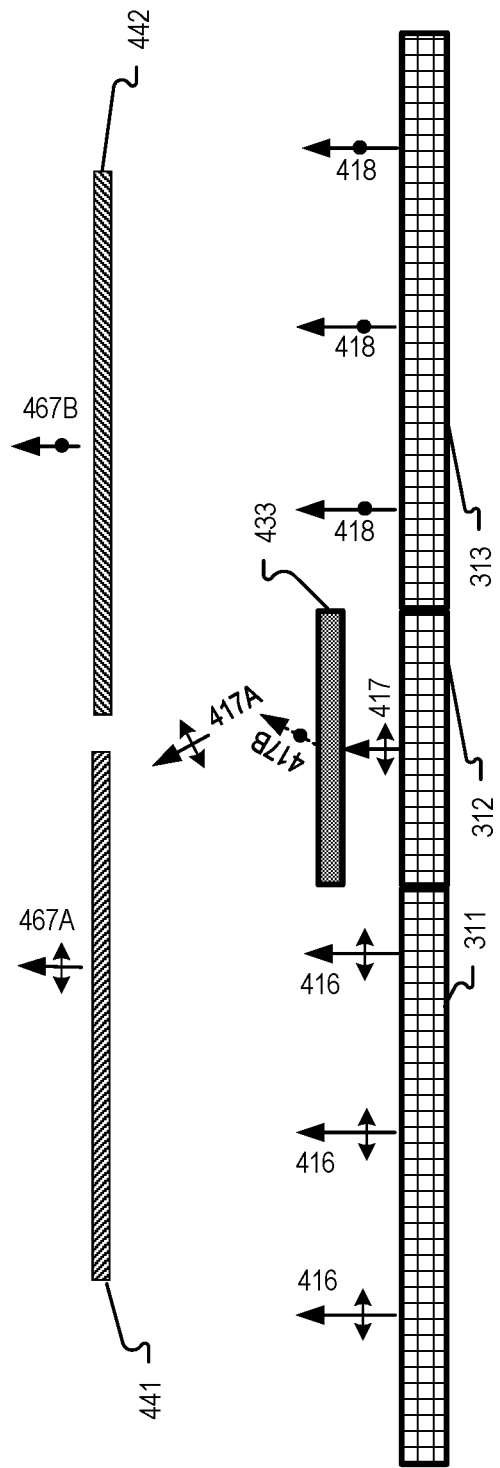

FIG. 4B illustrates that first polarization layer 441 is configured to block light of the second polarization orientation (s-polarized light in the illustrated example) from propagating to the first eye 301 and pass light 467A having the first polarization orientation (p-polarized light, in the illustrated example). Second polarization layer 442 is configured to block light of the first polarization orientation (p-polarized light in the illustrated example) from propagating to the second eye 302 and pass light 467B having the first polarization orientation (s-polarized light, in the illustrated example). Consequently, while second display light 417B will be emitted in the FOV 421 of first eye 301 while SHW 433 is driven to the second state, second display light 417B has the second polarization orientation that will be blocked from reaching eye 301 by polarization layer 441. Similarly, second display light 417A will be emitted in the FOV 422 of second eye 302 while SHW 433 is driven to the first state, but second display light 417A has the first polarization orientation that will be blocked from reaching eye 302 by polarization layer 442. Hence, eye 301 only views second display light 417 when SHW 433 is driven to the first state and eye 302 only views second display light 412 when SHW 433 is driven to the second state. In this way, SHW 433 is able to selectively direct the second display light 417 to each eye.

Figure 5:
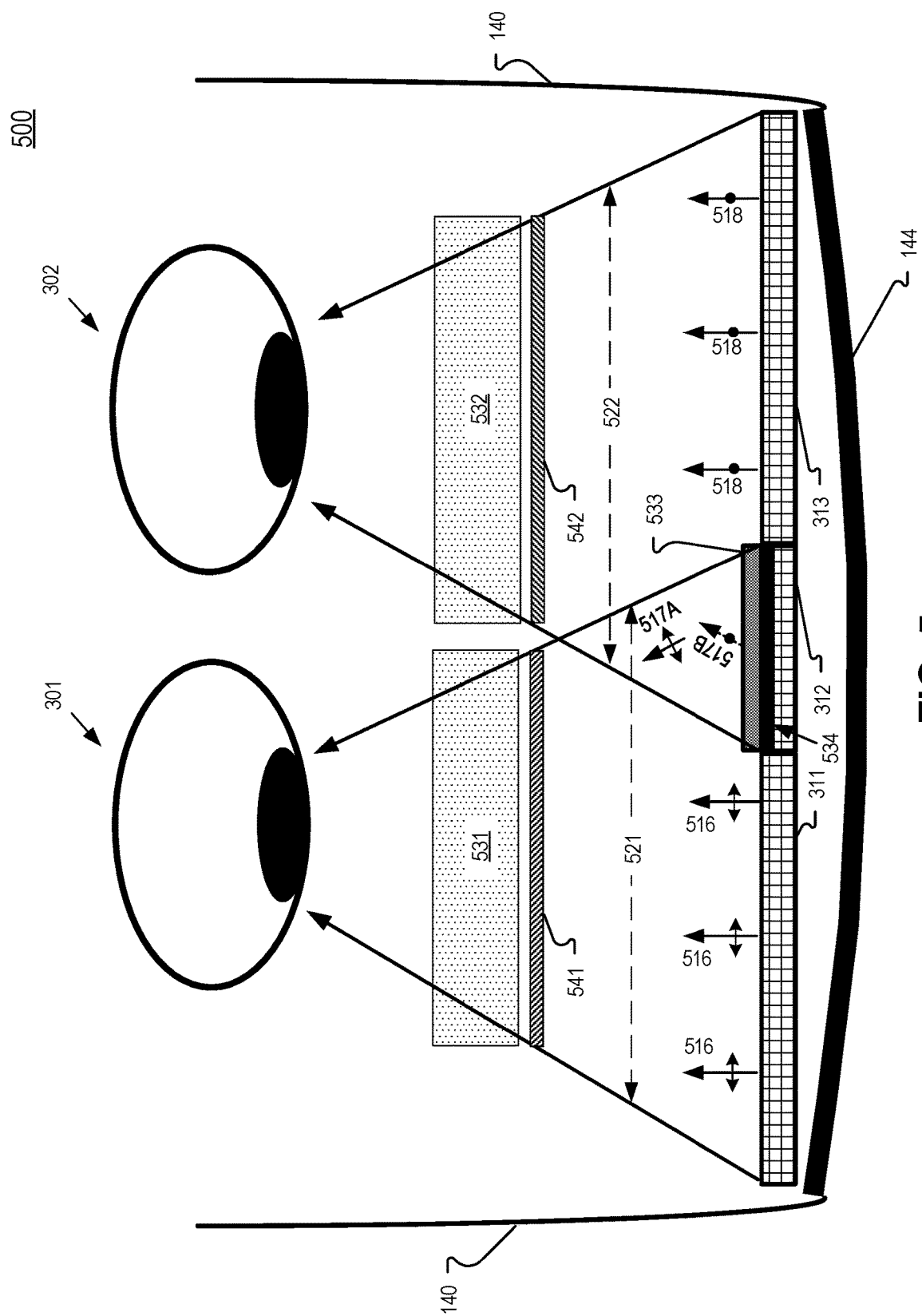
FIG. 5 illustrates an HMD having a switchable quarter-waveplate as a selectable optical element, in accordance with an embodiment of the disclosure.

FIG. 5 illustrates an HMD that also uses a switchable waveplate to selectively direct second display light to eyes 301 and 302, in accordance with an embodiment of the disclosure. In FIG. 5, the selectable optical element includes a switchable quarter-waveplate (SQW) 533. In the illustrated embodiment, SQW 533 is disposed over a static quarter-waveplate 534 so that second display light emitted from second display pixels 312 encounter both the static quarter-waveplate 534 and the SQW 533. SQW 533 may be selectively driven to a first state corresponding to a first retardance value (e.g. 0λ) and a second state corresponding to a second retardance value (e.g. λ/4). Processing logic (not illustrated) may send a digital or analog electronic signal to SQW 533 to select between the first and second state, for example. When SQW 533 is in the first state corresponding to the first retardance value, the polarization orientation of second display light emitted by second display pixels 312 may be unchanged as it propagates through SQW 533. When SQW 533 is in the second state corresponding to the second retardance value, the polarization orientation of second display light emitted by second display pixels 312 may be changed to a second polarization orientation that is different from the first polarization orientation. In the illustrated embodiment, the first polarization orientation is p-polarized and the second polarization orientation is s-polarized. Utilizing the thinner SQW 533 rather than a thicker SHW 433 may decrease optical aberrations imparted by a switchable waveplate being disposed over the second display pixels 312. FIG. 5 illustrates an embodiment where second display pixels 312 emit polarized display light. In an embodiment where second display pixels 312 emit non-polarized display light, a linear polarizer may be disposed beneath static quarter-waveplate 534.

Figure 6:
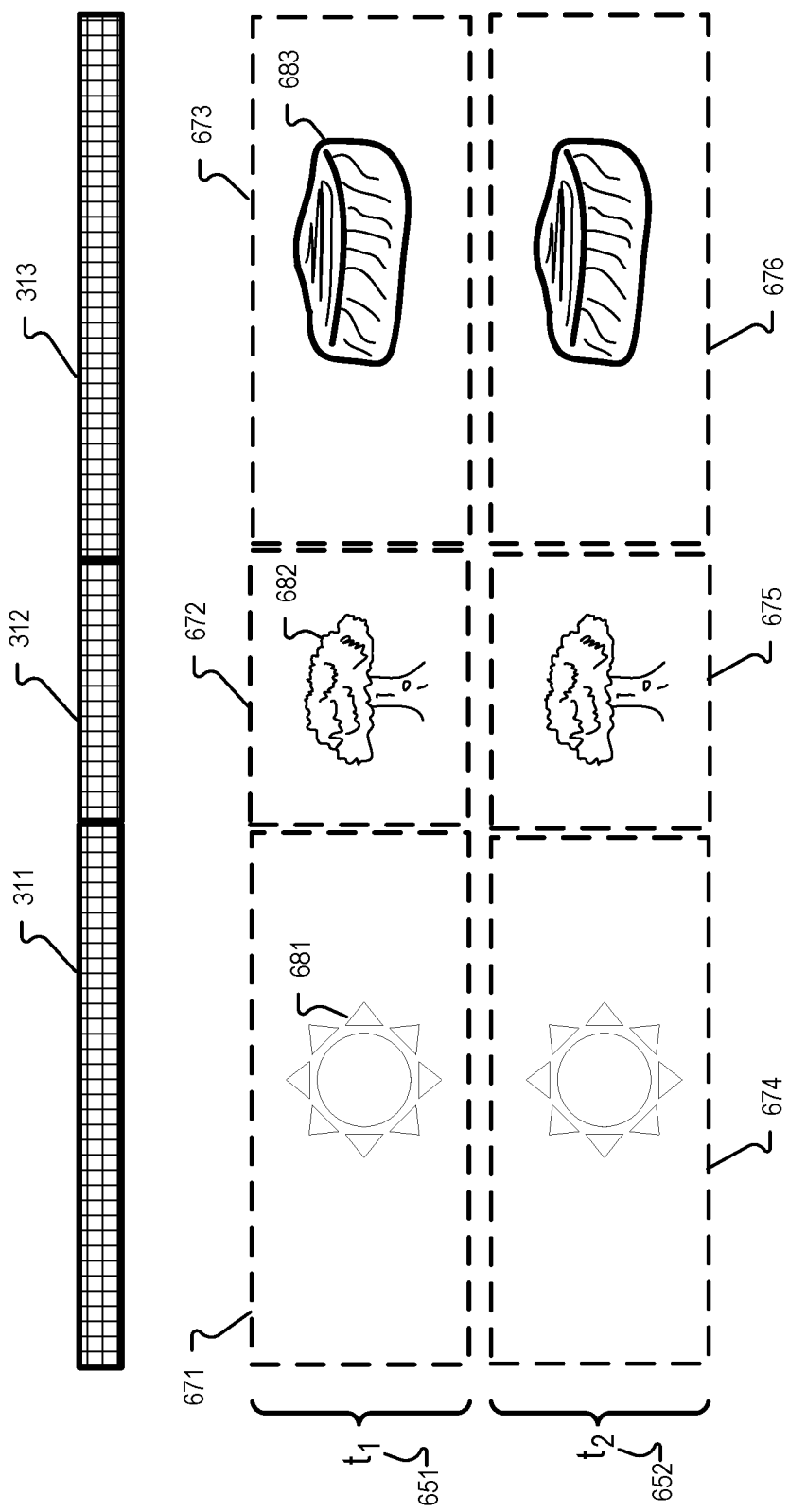
FIG. 6 illustrates sub-images of an image that may be presented to a user by first display pixels, second display pixels, and third display pixels, in accordance with an embodiment of the disclosure.

FIG. 6 illustrates sub-images of a virtual image that may be presented to a user by first display pixels 311, second display pixels 312, and third display pixels 313, in accordance with an embodiment of the disclosure. At a first time period 651, first display pixels 311 present sub-image 671, second display pixels 312 present sub-image 672, and third display pixels 313 presents sub-image 673. Sub-image 671 includes a sun 681, sub-image 672 includes a tree 682, and sub-image 673 includes a stone 683, in the illustrated example where a binocular virtual image presented to the user includes the sun 681, tree 682, and stone 683. In the first time period 651, the switchable waveplate (e.g. 433/533) is in the first state and generates second display light that is only visible to first eye 301. For example, the second display light may be p-polarized light that passes through polarization layer 441 to become incident on eye 301. Therefore, sub-image 672 is visible to eye 301 along with sub-image 671, which has the same polarization orientation as sub-image 672. In first time period 651, sub-image 673 is visible to eye 302, but sub-image 672 is not visible to eye 302.

At a second time period 652, first display pixels 311 present sub-image 674, second display pixels 312 present sub-image 675, and third display pixels 313 presents sub-image 676. In second time period 652, the switchable waveplate (e.g. 433/533) is in the second state and generates second display light that is only visible to second eye 302. For example, the second display light may be s-polarized light that passes through polarization layer 442 to become incident on eye 302. Therefore, sub-image 675 is visible to eye 302 along with sub-image 676, which has the same polarization orientation as sub-image 675. In second time period 652, sub-image 674 is visible to eye 301, but sub-image 675 is not visible to eye 301.

Sub-image 671 and 674 may be the same and unchanged across first time period 651 and second time period 652. Similarly, sub-image 673 and 676 may be the same and unchanged across first time period 651 and second time period 652. When sub-image 671 and 674 and sub-image 673 and 676 remain unchanged, the selectable optical element may be driven at a frame rate that is approximately twice the frame rate of first display pixels 311 and third display pixels 313. Sub-image 672 includes tree 682 and is rendered for the perspective of eye 301 and include the associated vignetting for eye 301. Sub-image 675 also includes tree 682 but is different from sub-image 672 in that it is rendered for the perspective of eye 302 and may include the associated vignetting for eye 302. Of course, videos can be generated by the systems and techniques described in this disclosure by splitting each frame of a video into the subframes described here.

Figure 7:
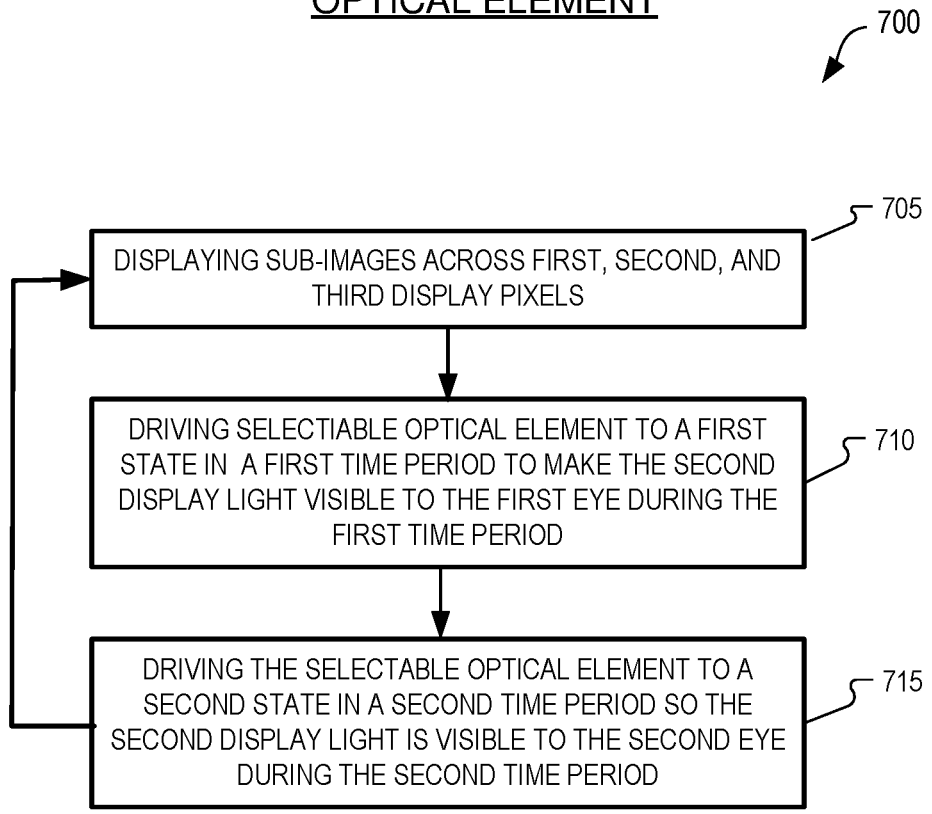
FIG. 7 illustrates a flow chart of an example process of expanding a FOV with a selectable optical element, in accordance with an embodiment of the disclosure.

FIG. 7 illustrates a flow chart of an example process 700 of expanding a FOV with a selectable optical element, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

In process block 705, sub-images are displayed across first, second, and third display pixels. The first display pixels and the second display pixels are within a first FOV of a first eye (e.g. 301) of the user of the HMD. The second display pixels and the third display pixels are within a second FOV of a second eye (e.g. 302) of the user. In one embodiment, the third display pixels are not viewable by the first eye and the first display pixels are not viewable by the second eye.

In process block 710, a selectable optical element is driven to a first state in a first time period. The selectable optical element is disposed over the second display pixels and the second display light from the second display pixels is visible to the first eye during the first time period.

In process block 715, the selectable optical element is driven to a second state in a second time period. The second display light from the second display pixels is visible to the second eye during the second time period and not the first time period. The second display light from the second display pixels is not visible to the first eye during the second time period.

After executing process block 715, process 700 may return to process block 705 and new sub-images may be driven onto the first, second, and third display pixels where the new sub-images correspond to a next frame of a video, for example.

In one embodiment, the selectable optical element includes a switchable waveplate and driving the selectable optical element to the first state includes driving the switchable waveplate to a first retardance value. Driving the selectable optical element to the second state may include driving the switchable waveplate to a second retardance value different from the first retardance value.

In one embodiment, the first display light from the first display pixels has a first polarization orientation and third display light from the third display pixel has a second polarization orientation different from the first polarization orientation. The switchable waveplate may impart the first polarization orientation to the second display light while the switchable waveplate is driven to the first state and the switchable waveplate may impart the second polarization orientation to the second display light while the switchable waveplate is driven to the second state.

In one embodiment, the switchable waveplate is a switchable half-waveplate and the first retardance value is approximately $0\lambda$, and the second retardance value is approximately $\lambda/2$.

In one embodiment, the switchable waveplate is a switchable quarter-waveplate and the first retardance value is approximately $0\lambda$ and the second retardance value is approximately $\lambda/4$. In this embodiment, a static quarter-waveplate is disposed between the switchable quarter-waveplate and the second display pixels.

The first display pixels, second display pixels, and third display pixels may be included in a contiguous display pixel array. In one embodiment, the first display pixels, second display pixels, and third display pixels are included a first display pixel array, a second display pixel array, and a third display pixel array, respectively. The first display pixel array may be separate from the second display pixel array and the second display pixel array may be separate from the third display pixel array.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method of presenting a virtual image to a user of a head mounted display (HMD), the computer-implemented method comprising:
    displaying sub-images across first display pixels, second display pixels, and third display pixels, wherein the first display pixels and the second display pixels are within a first field of view (FOV) of a first eye of the user of the HMD, and wherein the second display pixels and the third display pixels are within a second FOV of a second eye of the user;
    driving a selectable optical element to a first state in a first time period, wherein the selectable optical element is disposed over the second display pixels, and wherein second display light from the second display pixels is visible to the first eye during the first time period; and
    driving the selectable optical element to a second state in a second time period, wherein the second display light from the second display pixels is visible to the second eye during the second time period and not the first time period.

2. The computer-implemented method of claim 1, wherein the third display pixels are not visible to the first eye and the first display pixels are not visible to the second eye.

3. The computer-implemented method of claim 1, wherein the selectable optical element includes a switchable waveplate, and wherein driving the selectable optical element to the first state includes driving the switchable waveplate to a first retardance value, and wherein driving the selectable optical element to the second state includes driving the switchable waveplate to a second retardance value different from the first retardance value.

4. The computer-implemented method of claim 3, wherein first display light from the first display pixels has a first polarization orientation, and wherein third display light from the third display pixels has a second polarization orientation different from the first polarization orientation,
    the switchable waveplate imparting the first polarization orientation to the second display light while the switchable waveplate is driven to the first state and the switchable waveplate imparting the second polarization orientation to the second display light while the switchable waveplate is driven to the second state.

5. The computer-implemented method of claim 3, wherein the switchable waveplate is a switchable half-waveplate, and wherein the first retardance value is approximately $0\lambda$ and the second retardance value is approximately $\lambda/2$.

6. The computer-implemented method of claim 3, wherein the switchable waveplate is a switchable quarter-waveplate, and wherein the first retardance value is approximately $0\lambda$ and the second retardance value is approximately $\lambda/4$,
    wherein a static quarter-waveplate is disposed between the switchable quarter-waveplate and the second display pixels.

7. The computer-implemented method of claim 1, wherein the selectable optical element is driven at a frame rate that is at least twice that of the first display pixels and the third display pixels.

8. The computer-implemented method of claim 1, wherein the first display pixels, second display pixels, and third display pixels are included in a contiguous display pixel array.

9. The computer-implemented method of claim 1, wherein the first display pixels, second display pixels, and third display pixels are included in a first display pixel array, a second display pixel array, and a third display pixel array, respectively, and wherein the first display pixel array is separate from the second display pixel array and the second display pixel array is separate from the third display pixel array.

10. The computer-implemented method of claim 1, wherein the second display pixels are driven approximately twice as bright as the first display pixels and the third display pixels.

11. A Head Mounted Display (HMD) comprising:
    first display pixels, second display pixels, and third display pixels;
    a first optical assembly configured to focus first display light from the first display pixels and second display light from the second display pixels for a first eye of a user of the HMD;
    a second optical assembly configured to focus the second display light from the second display pixels and third display light from the third display pixels for a second eye of a user of the HMD; and
    a selectable optical element disposed over the second display pixels, wherein the second display light is viewable through the first optical assembly and not the second optical assembly when the selectable optical element is driven to a first state, and wherein the second display light is viewable through the second optical assembly and not the first optical assembly when the selectable optical element is driven to a second state.

12. The HMD of claim 11, wherein the selectable optical element includes a switchable waveplate, and wherein driving the selectable optical element to the first state includes driving the switchable waveplate to a first retardance value, and wherein driving the selectable optical element to the second state includes driving the switchable waveplate to a second retardance value different from the first retardance value.

13. The HMD of claim 12, wherein first display light from the first display pixels has a first polarization orientation, and wherein third display light from the third display pixels has a second polarization orientation different from the first polarization orientation, the switchable waveplate imparting the first polarization orientation to the second display light while the switchable waveplate is driven to the first state and the switchable waveplate imparting the second polarization orientation to the second display light while the switchable waveplate is driven to the second state.

14. The HMD of claim 13 further comprising:
a first polarization layer configured to block light having the second polarization orientation from propagating to the first eye of the user of the HMD; and
a second polarization layer configured to block the light having the first polarization orientation from propagating to the second eye.

15. The HMD of claim 12, wherein the switchable waveplate is a switchable half-waveplate, and wherein the first retardance value is approximately $0\lambda$ and the second retardance value is approximately $\lambda/2$.

16. The HMD of claim 12, wherein the switchable waveplate is a switchable quarter-waveplate, and wherein the first retardance value is approximately $0\lambda$ and the second retardance value is approximately $\lambda/4$, the HMD of claim 12 further comprising:
a static quarter-waveplate disposed between the switchable quarter-waveplate and the second display pixels.

17. The HMD of claim 11, wherein the selectable optical element is driven at a frame rate that is at least twice that of the first display pixels and the third display pixels.

18. The HMD of claim 11, wherein the first display pixels, second display pixels, and third display pixels are included in a contiguous display pixel array.

19. The HMD of claim 11, wherein the first display pixels, second display pixels, and third display pixels are included in a first display pixel array, a second display pixel array, and a third display pixel array, respectively, and wherein the first display pixel array is separate from the second display pixel array and the second display pixel array is separate from the third display pixel array.

20. The HMD of claim 11, wherein the second display pixels are driven approximately twice as bright as the first display pixels and the third display pixels.

* * * * *